United States Patent [19]
Hollenbeck et al.

[11] Patent Number: 5,982,122
[45] Date of Patent: Nov. 9, 1999

[54] CAPACITIVELY POWERED MOTOR AND CONSTANT SPEED CONTROL THEREFOR

[75] Inventors: Robert K. Hollenbeck; David M. Erdman; James R. Kiefer, all of Fort Wayne, Ind.

[73] Assignee: General Electric Company, Schenectady, N.Y.

[21] Appl. No.: 08/761,748

[22] Filed: Dec. 5, 1996

[51] Int. Cl.⁶ .................................................. H01R 39/46
[52] U.S. Cl. ...................... 318/439; 318/781; 318/794; 318/809; 318/817; 318/254
[58] Field of Search ................................... 318/254, 438, 318/139, 778–815

[56] References Cited

U.S. PATENT DOCUMENTS

| | | | |
|---|---|---|---|
| 4,095,149 | 6/1978 | Wanlass | 318/799 |
| 4,347,464 | 8/1982 | Park et al. | 318/254 |
| 4,891,567 | 1/1990 | Fujitani et al. | 318/254 |
| 4,987,331 | 1/1991 | Horng | 310/254 |
| 5,093,599 | 3/1992 | Horng | 310/254 |
| 5,122,697 | 6/1992 | Horst | 310/181 |
| 5,168,202 | 12/1992 | Bradshaw et al. | 318/608 |
| 5,179,308 | 1/1993 | Malsky | 310/90.5 |
| 5,268,623 | 12/1993 | Muller | 318/434 |
| 5,406,184 | 4/1995 | Bahn | 318/701 |
| 5,492,458 | 2/1996 | Horng | 417/423.7 |
| 5,710,493 | 1/1998 | Flynn | 318/254 |

FOREIGN PATENT DOCUMENTS

| | | | |
|---|---|---|---|
| 0613234 A1 | 2/1994 | European Pat. Off. | H02P 6/02 |
| 01248988 | 10/1989 | Japan | H02P 6/02 |
| 06245581 | 9/1994 | Japan | H02P 6/02 |

OTHER PUBLICATIONS

J.S. Mayer, et al., IEEE, "Analysis and Modeling of a Single–Phase Bruchless DC Motor Drive System," Sep. 1989, No. 3.

*Primary Examiner*—David Martin
*Attorney, Agent, or Firm*—Senniger, Powers, Leavitt & Roedel; Wayne O. Traynham; Carl B. Horton

[57] ABSTRACT

A capacitively powered motor having a power switching circuit adapted to be connected between a power source and its winding for selectively energizing the winding to generate a magnetic field which causes a rotating assembly to rotate. A position sensing circuit provides a position signal representative of the position of the rotating assembly and a commutating circuit controls the power switching circuit to commutate the power switching circuit at a commutating angle and at a substantially constant duty cycle to achieve a desired rotating speed of the rotating assembly. The commutating circuit varies the commutating angle in response to the position signal to maintain the substantially constant rotating speed of the rotating assembly. As result, the efficiency of the motor is varied to maintain the substantially constant rotating speed.

15 Claims, 3 Drawing Sheets

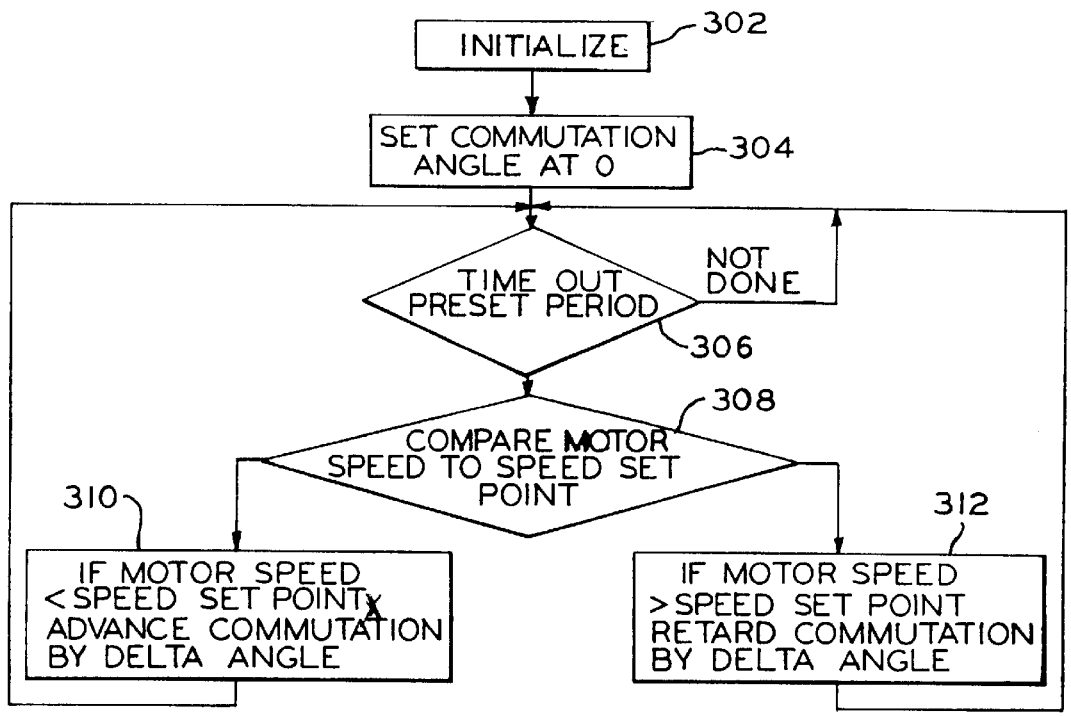
FIG_3A
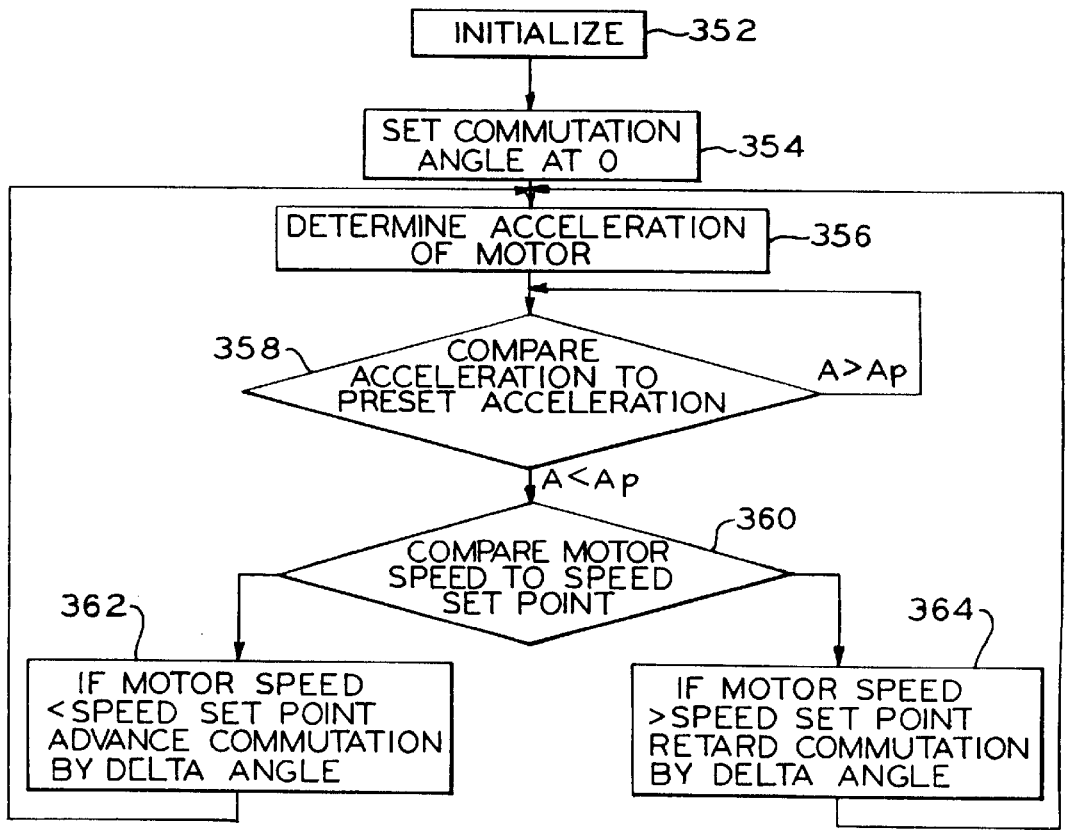
FIG_3B

CAPACITIVELY POWERED MOTOR AND CONSTANT SPEED CONTROL THEREFOR

BACKGROUND OF THE INVENTION

1. Field of the Invention

The invention generally relates to capacitively powered motors and, in particular a speed control for a single phase capacitively powered motor which maintains the motor speed at a preselected value.

2. Description of the Prior Art

In order to keep manufacturing costs of low cost capacitive motors to a minimum, the control circuit for these low output type of motors uses an input capacitor to lower the input voltage, and to set the power to the motor at a given voltage and frequency. The setting of the power at a given voltage and frequency allows some of the control failure modes to be impedance protected which simplifies the circuit and reduces its costs. This also avoids the need for commercial thermal fuses in order to protect certain failure modes.

One disadvantage to setting the power applied to the motor at a certain level is that the motor speed will vary depending on environmental conditions and, in particular, depending on the resistance to rotation which the motor encounters. There is a need for a low output, low cost capacitively powered motor which operates at a constant or near constant speed.

SUMMARY OF THE INVENTION

It is an object of this invention to provide a low cost, low output capacitively powered motor which operates at a constant speed although its efficiency may vary.

It is another object of this invention to provide a capacitively powered motor which maintains a constant speed by advancing or retarding the commutation angle.

It is another object of this invention to provide a capacitively powered low output, low cost motor which operates at a selectable substantially constant speed.

It is another object of this invention to provide a capacitively powered motor which is low in cost and which may be employed as an evaporator fan motor for refrigeration.

In one form, the invention comprises a motor system for use with a power source. A stationary assembly is in magnetic coupling relation to a rotating assembly and includes a winding. A power switching circuit is adapted to be connected to the power source and is connected to the winding for selectively energizing the winding to generate a magnetic field which causes the rotating assembly to rotate. A position sensing circuit provides a position signal representative of the position of the rotating assembly. A commutating circuit controls the power switching circuit to commutate the power switching circuit at a commutating angle and at a substantially constant duty cycle to achieve a desired rotating speed of the rotating assembly. The commutating circuit varies the commutating angle in response to the position signal to maintain a substantially constant rotating speed of the rotating assembly whereby the efficiency of the motor is varied to maintain the substantially constant rotating speed.

In another form, the invention comprises a control circuit for a motor for use with a power source and having a rotating assembly, and a stationary assembly in magnetic coupling relation to the rotating assembly and including a winding. The circuit includes a power switching circuit, a position sensing circuit and a commutating circuit. The power switching circuit is adapted to be connected to the power source and is connected to the winding for selectively energizing the winding to generate a magnetic field which causes the rotating assembly to rotate. The position sensing circuit provides a position signal representative of the position of the rotating assembly. The commutating circuit controls the power switching circuit to commutate the power switching circuit at a commutating angle and at a substantially constant duty cycle to achieve a desired rotating speed of the rotating assembly. The commutating circuit varies the commutating angle in response to the position signal to maintain the substantially constant rotating speed of the rotating assembly whereby the efficiency of the motor is varied to maintain the substantially constant rotating speed.

In another form, the invention comprises a motor system for use with a power source and includes a rotating assembly, a stationary assembly in magnetic coupling relation to the rotating assembly and including a winding and a control circuit. The control circuit includes a capacitive power switch circuit, a position sensing circuit and a switching circuit. The capacitive power switch circuit includes power switches adapted to be connected between the power source and the winding for selectively energizing the winding to generate a magnetic field which causes the rotating assembly to rotate. The position sensing circuit provides a position signal representative of the position of the rotating assembly. The switching circuit controls the power switches to selectively energize the winding to achieve a desired rotating speed of the rotating assembly, wherein the switching circuit varies an efficiency of the motor in response to the position signal to maintain the substantially constant rotating speed of the rotating assembly.

Other objects and features will be in part apparent and in part pointed out hereinafter.

BRIEF DESCRIPTION OF THE DRAWINGS

FIG. 3A is a flow chart of one preferred embodiment of software for operating the microprocessor of the control circuit of FIG. 1 in which a time delay is used to allow for stable motor operation.

FIG. 3B is a flow chart of one preferred embodiment of software for operating the microprocessor of the control circuit of FIG. 1 in which acceleration monitoring is used to allow for stable motor operation.

Corresponding reference characters indicate corresponding parts throughout the drawings.

DETAILED DESCRIPTION OF THE PREFERRED EMBODIMENTS

Figure 1:
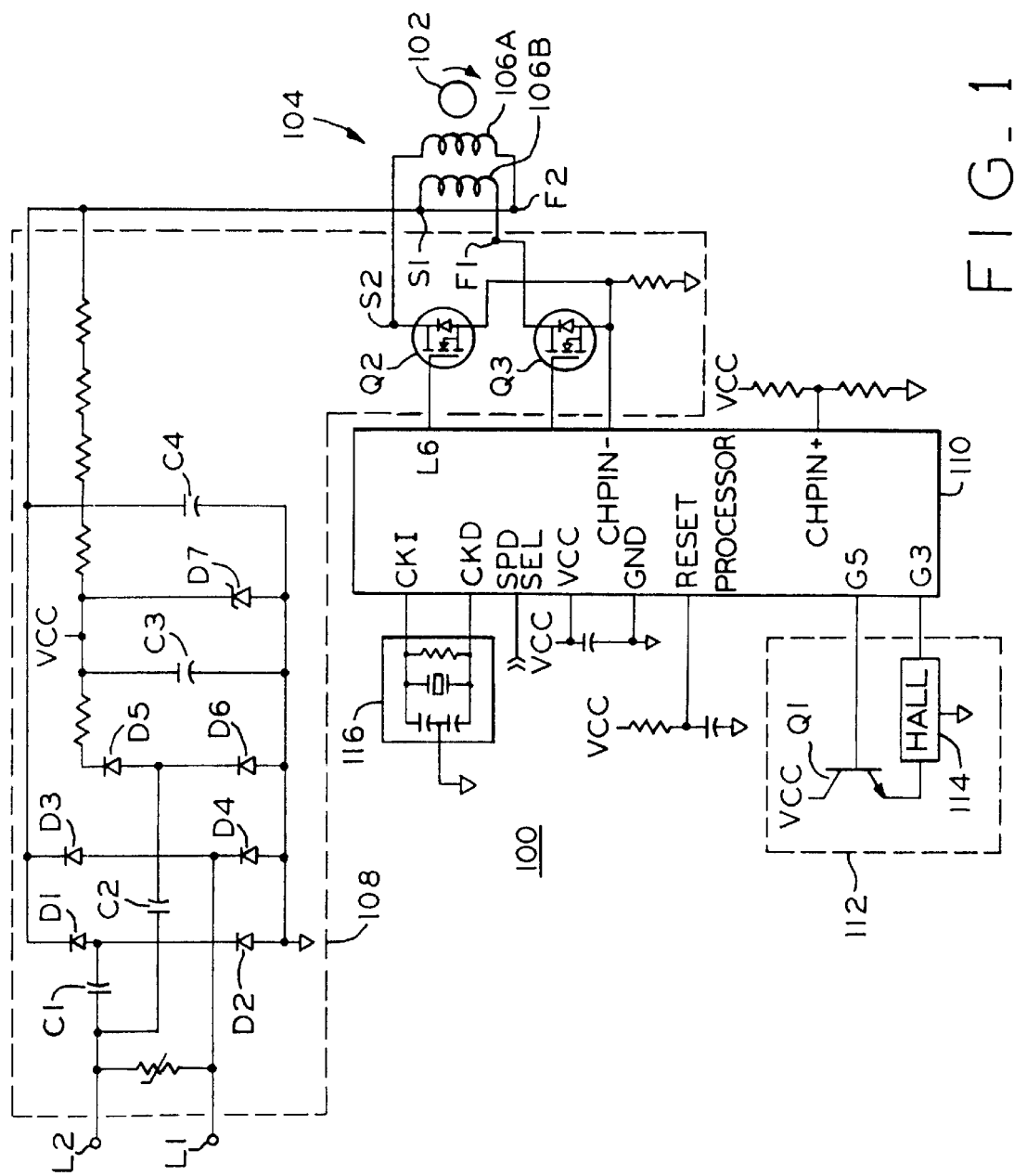
FIG. 1 is a schematic diagram one preferred embodiment of constant speed control circuit and motor according to the invention.

Referring to FIG. 1, a schematic diagram of one preferred embodiment of a constant speed control circuit and motor 100 according to the invention is illustrated. The motor is for use with an alternating current power source (not shown) which would be connected to input terminals L1 and L2. The motor includes a rotating assembly 102 such as a permanent magnet rotor which is received within a stationary assembly 104 in magnetic coupling relation to the rotating assembly 102 and including a winding 106. As illustrated in FIG. 1, the motor may be a single phase motor in which case the winding may be comprised of two bifilar or layered windings 106A and 106B, each of which energized for approximately one half of the rotation of the rotating assembly 102 to apply a magnetic field to the rotating assembly to cause it to rotate. As an example and not by way of limitation, the rotating assembly 102 and the stationary assembly 104 may be a MOTOR WITH EXTERNAL ROTOR AND METHOD FOR ASSEMBLY as described in co-assigned, co-pending U.S. patent application Ser. No. 08/761,728, filed Dec. 5, 1996, the entire disclosure of which is incorporated herein by reference.

The motor 100 also includes a power switching circuit 108 adapted to be connected to the power source via terminals L1 and L2 and connected to the windings at terminations S1, S2, F1, F2 for selectively energizing the winding 106 to generate a magnetic field which causes the rotating assembly 102 to rotate. In particular, the power switching circuit 108 includes a capacitive circuit for driving the winding 106. In particular, power capacitor C1 in series with the power supply determines the amount of power which is applied to the windings. Capacitor C1 is connected to a diode bridge D1-D4 which rectifies the alternating current applied to the terminals L1, L2. Filter capacitor C4 smooths the rectified dc voltage to be applied to the windings 106.

The power switching circuit 108 also includes two FET power switches Q2, Q3 for selectively connecting the windings 106A, 106B to the ground thereby completing the circuit for applying the rectified dc to the windings.

The motor 100 also includes a commutating circuit, such as a microprocessor 110 for controlling the FET power switches Q2, Q3 to commutate the power switching so that the winding 106 is energized at a commutating angle. The microprocessor controls the FET switches Q2, Q3 to apply power to the windings 106 at a substantially constant duty cycle to achieve a desired rotating speed of the rotating assembly 102. The microprocessor 110 uses an oscillator 116 as a time reference and varies the commutating angle in response to a position signal provided by a position sensing circuit 112. The position signal is representative of the position of the rotating assembly 102. As a result, the microprocessor 110 maintains a substantially constant rotating speed of the rotating assembly 102. By varying the commutating angle, the power input into the motor remains substantially constant while the motor output is effectively reduced so that the efficiency of the motor is varied to maintain the substantially constant rotating speed.

Preferably, the position sensing circuit 112 includes a hall device 114 or other position sensing device or circuit positioned in proximity to the rotating assembly 102 to provide a position signal representative of the position of the rotating assembly 102. Preferably, the hall device 114 is positioned to indicate a signal when a back emf of the winding 106 becomes positive. Preferably, hall device 114 is intermittently operated by the microprocessor 110 by pulse width modulating of a switch Q1 in order to reduce the power needed to operate the hall device. When the hall device is properly positioned to indicate when a back emf of the winding 106 becomes positive, the processor 110 controls the power switches Q2, Q3 to energize the winding 106 for a preset period beginning when the position signal generated by the hall device 114 indicates that the back emf becomes positive. It is also contemplated that a back emf position sensing circuit may be used in addition to or in place of the hall device 114.

Power capacitor C1 forms a capacitive circuit for driving the windings 106. The microprocessor 110 of the commu-tating circuit advances a commutating angle when the position signal provided by the position sensing circuit 112 indicates that the speed of the rotating assembly 102 is less than the desired rotating speed. Alternatively, the microprocessor 110 retards the commutating angle when the position signal indicates that the speed of the rotating assembly 102 is greater than the desired rotating speed. It is contemplated that the microprocessor 110 may have an input SPD SEL for selecting the speed at which the motor will operate, for varying the speed according to an input signal or for selecting between a preset number of speeds. As illustrated in FIG. 1, the processor 110 includes an input G3 for receiving the position signal generated by the hall device 114 and has outputs L5, L6 for controlling the FET switches Q2, Q3. As indicated above, the commutating circuit 108 energizes each part of the windings 106A, 106B at a substantially constant duty cycle which means that each part of the winding is energized for a preset period of time of approximately 75% of the period of time during which the back emf is positive.

Figure 2:
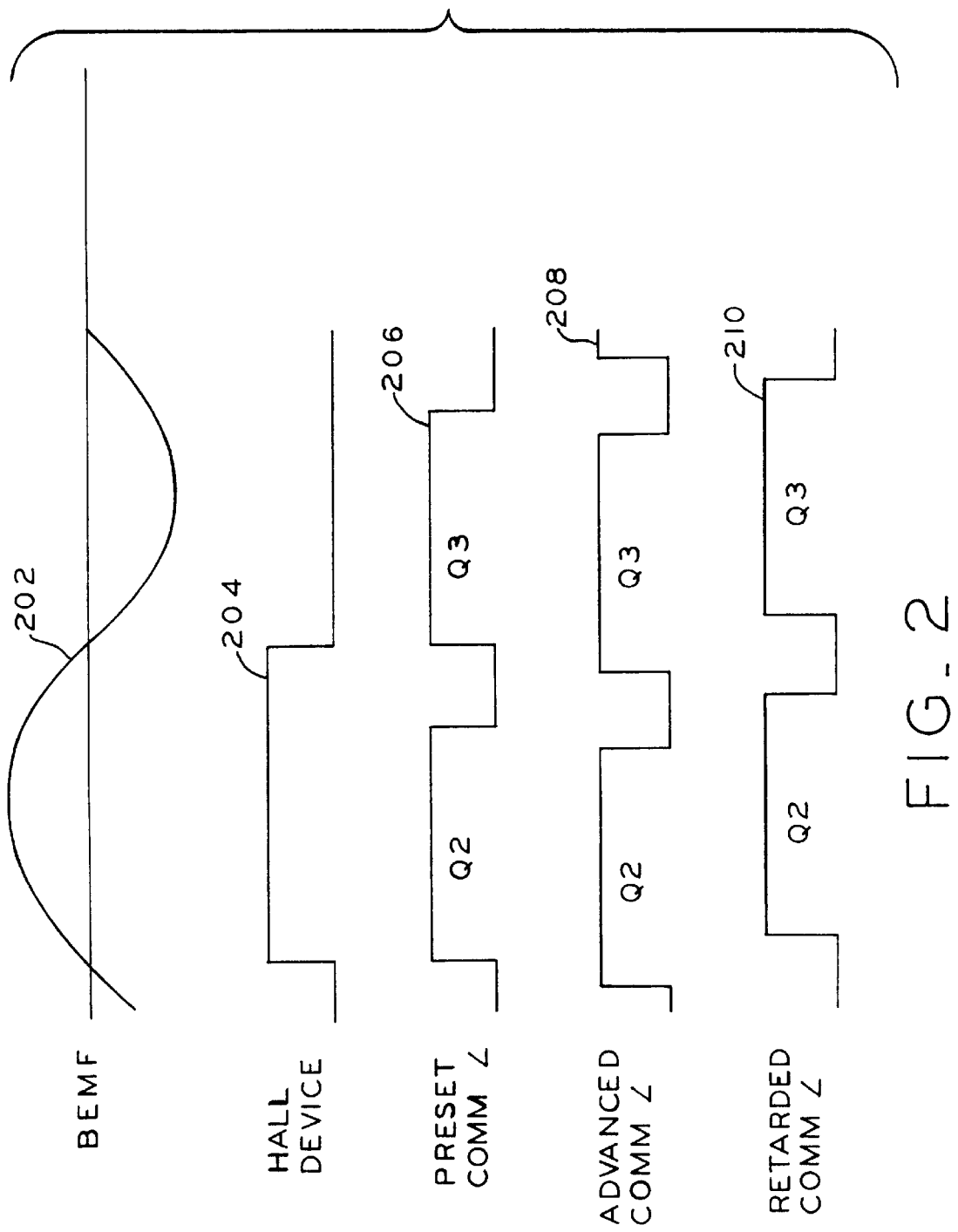
FIG. 2 is a timing diagram of the waveforms of the motor according to the invention.

Referring to FIG. 2, a timing diagram of the waveforms of the motor 100 according to the invention is illustrated. Waveform 202 illustrates the back emf induced in the winding 106 by the rotation of rotating assembly 102. Waveform 202 is illustrated with a somewhat flat top. However, the actual shape of the back emf waveform will depend on the skewing of the permanent magnets of the rotating assembly 102 and also may depend on the shape of the stator teeth. Preferably, the hall device 114 is positioned to provide a signal 204 which corresponds to the period of time that the back emf waveform 202 is positive. Although the hall device position signal 204 is shown as a single, continuous pulse during the period that the back emf is positive, it is contemplated that the hall device may be pulsed width modulated by switch Q1 so that, in fact, pulse 204 would be a series of pulses depending on the duty cycle (pulse width) of the modulation by switch Q1. For convenience, the hall device waveform 204 is illustrated as a single pulse 204. Preferably, the hall device is positioned on the stator 104 at the commutation point so that it is affected by the magnetic flux between the teeth of the stator 104.

Normally, the motor would be configured to energize the winding for a period of time beginning when the back emf turns positive so that a desired operating speed would be achieved at a preset commutation angle arbitrarily defined as 0°. Waveform 206 illustrates this aspect in which FET switch Q2 is closed for 75% of the period of time that the back emf is positive in order to energize winding 106A. Similarly, FET switch Q3 is closed for 75% of the time that the back emf is negative to energize winding 106B. Although the energization of the windings may be pulse width modulated, it is contemplated that the windings would be continuously energized to reduce audible noise. Generally, commutating the windings beginning with the zero crossing of the back emf would provide the most efficient operation of the motor.

In the event that the mechanical load being driven by the rotating assembly 102 is reduced, the motor speed would normally increase because the same amount of power is being applied via capacitor C1. For example, rotating assembly 102 may drive an evaporator fan of a refrigerator. If the resistance to airflow is somewhat diminished, an increase in the speed of the motor would result. In order to maintain the motor at constant speed to thereby accomplish constant airflow, the microprocessor 110 would be programmed to advance the commutation angle of the windings as illustrated by waveform 208. Since the duty cycle remains substantially constant, the turn on and turn off times are both advanced by about the same amount of time. The extent to which the commutation angle may be advanced to speed up the motor depends on the magnetic and electrical characteristics of the motor. At some point, an advanced angle will reach a point of diminishing returns. In general, the current flow into the motor depends on the inductance of the motor so that low inductance motors will not respond as significantly as high inductance motors to an advance in the state timing.

In the event that the mechanical load being driven by the rotating assembly 102 is increased, the motor speed would normally decrease because the same amount of power is being applied via capacitor C1. For example, rotating assembly 102 may drive an evaporator fan of a refrigerator. If the resistance to airflow is somewhat increased, an decrease in the speed of the motor would result. In order to maintain the motor at constant speed to thereby accomplish constant airflow, the commutation angle of the windings would be retarded as illustrated by waveform 210. Since the duty cycle remains substantially constant, the turn on and turn off time are both retarded by about the same amount of time. The extent to which the commutation angle may be retarded to slow down the motor depends on the magnetic and electrical characteristics of the motor. At some point, a retarded angle will reach a point of diminishing returns. In general, the current flow into the motor depends on the inductance of the motor so that low inductance motors will not respond as significantly as high inductance motors to an advance in the state timing.

Diodes D5 and D6, filter capacitor C3, Zener diode D7 and current source capacitor C2 generate an VCC voltage for driving the microprocessor 110.

Since capacitor C1 limits the power applied to the windings, it avoids the need for a thermal fuse in series with capacitor C4 for safety considerations. As a minimum, a 50% duty cycle is needed to rotate the rotor 102 whereas the maximum duty cycle is 100% during the period that the back emf is positive. A 75% duty cycle tends to be the most efficient. The 75% duty cycle is generally set at the most efficient point for a low power supply line voltage at maximum load. This is in part due to the fact that the FET power switches Q2 and Q3 are in an avalanche condition when turned off because of the mutual inductance in these solid state devices. In general, varying the duty cycle of the voltage applied to the windings does not significantly effect the speed of the motor although it does significantly effect the efficiency of the motor. This is because varying the duty cycle tends to create other factors, such that interaction with the inductance of the motor, which will not be significantly effected. Once again, the power capacitor C1 provides a constant power so that the duty cycle alone does not determine the speed of the motor. Immediately before the zero crossing of the back emf, the inductance of the motor tends to be higher which is part of the compensating aspects involved.

FIGS. 3A and 3B are flow charts of preferred software embodiments for operating the microprocessor 110. Both flow charts are configured to advance the commutation angle by a delta angle if the motor speed is less than the speed set point or to retard the commutation angle by a delta angle if the motor speed is greater than the speed set point. The difference between the two flow charts is the technique which is used to determine motor stability. In FIG. 3A, a preset period is timed out in order to allow the motor to stabilize whereas FIG. 3B monitors motor acceleration to determine its stable operation.

Referring to FIG. 3A, after initializing at step 302, the commutation angle is set at zero by step 304. Step 306 times out a preset period to allow the motor to approach its operating speed. This preset period would preferably be approximately 2–5 seconds. After this preset period has been timed out, step 308 compares the actual motor speed to a speed set point. In general, the speed set point may be in the range of 1,400–1,800 RPMS, although any set point would be appropriate depending on the size and application of the motor. If the motor speed is less than the speed set point, step 310 advances the commutation by a delta angle. This delta angle will be approximately 8°. If the motor speed is greater than the speed set point, step 312 retards the commutation angle by the delta angle. The delta angle for retardation may be different than the delta angle for advancement. Microprocessor 110 returns to step 306 to continue its operation.

Similarly, in FIG. 3B, the microprocessor 110 is initialized by step 352 and the commutation angle is set to zero at step 354. At step 356, the microprocessor 110 determines the acceleration of the motor according to the position signal. This acceleration is compared to a preset acceleration such as 2 RPMs per second. If the motor acceleration is greater than the preset acceleration, the software holds at step 358. When the motor acceleration is less than the preset acceleration, suggesting that the acceleration is decreasing and the motor is beginning to stabilize, the microprocessor 110 proceeds to step 360 to compare the motor speed to the speed set point. If the motor speed is less than the speed set point, the commutation angle is advanced by a delta angle by step 362. Otherwise, if the motor speed is greater than the speed set point, the commutation angle is retarded by a delta angle by step 364. Microprocessor 110 returns to step 356 to continue its operation.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A motor system for use with a power source comprising:
   a rotating assembly;
   a stationary assembly in magnetic coupling relation to the rotating assembly and including a winding;
   a power switching circuit connected to the power source and connected to the winding for selectively energizing the winding to generate a magnetic field which causes the rotating assembly to rotate, said power switching circuit including a capacitive circuit in series with the power source for driving the winding;
   a position sensing circuit providing a position signal representative of the position of the rotating assembly; and
   a commutating circuit controlling the power switching circuit to commutate the power switching circuit at a commutating angle and at a substantially constant duty cycle to achieve a desired rotating speed of the rotating assembly, wherein the commutating circuit varies the commutating angle in response to the position signal to maintain the substantially constant rotating speed of the rotating assembly whereby the efficiency of the motor is varied to maintain the substantially constant rotating speed.

2. The motor system of claim 1 wherein the commutating circuit advances the commutating angle when the position signal indicates that the speed of the rotating assembly is less than the desired rotating speed and wherein the commutating circuit retards the commutating angle when the position signal indicates that the speed of the rotating assembly is greater than the desired rotating speed.

3. The motor of claim 1 wherein the power switching circuit include a power switch selectively connecting the winding to the power source via the capacitive circuit and wherein the commutating circuit comprises a processor having an input for receiving the position signal and having outputs for controlling the power switches.

4. The motor system of claim 3 wherein the position sensing circuit includes a hall device positioned to provide the position signal to indicate when a back emf of the winding becomes positive and wherein the processor controls the power switch to energize the winding for a preset period beginning when the position signal indicates that the back emf becomes positive.

5. The motor system of claim 4 wherein the preset period of time is approximately 75% of the period of time during which the back emf is positive.

6. The motor system of claim 3 wherein the winding comprises a single phase winding having first and second windings, wherein the power switching circuit includes first and second power switches, the first power switch energizing the first winding and the second power switch energizing the second winding and wherein the processor includes first and second outputs for controlling the first and second switches, respectively.

7. The motor system of claim 3 wherein the processor includes an input for selecting the desired rotating speed.

8. A control circuit for a motor for use with a power source and having a rotating assembly, and a stationary assembly in magnetic coupling relation to the rotating assembly and including a winding, the circuit comprising:
 a power switching circuit connected to the power source and connected to the winding for selectively energizing the winding to generate a magnetic field which causes the rotating assembly to rotate, said power switching circuit including a capacitive circuit in series with the power source for driving the winding;
 a position sensing circuit providing a position signal representative of the position of the rotating assembly; and
 a commutating circuit controlling the power switching circuit to commutate the power switching circuit at a commutating angle and at a substantially constant duty cycle to achieve a desired rotating speed of the rotating assembly, wherein the commutating circuit varies the commutating angle in response to the position signal to maintain the substantially constant rotating speed of the rotating assembly whereby the efficiency of the motor is varied to maintain the substantially constant rotating speed.

9. The control circuit of claim 8 wherein the commutating circuit advances the commutating angle when the position signal indicates that the speed of the rotating assembly is less than the desired rotating speed and wherein the commutating circuit retards the commutating angle when the position signal indicates that the speed of the rotating assembly is greater than the desired rotating speed.

10. A motor system for use with a power source comprising:
 a rotating assembly;
 a stationary assembly in magnetic coupling relation to the rotating assembly and including a single phase winding having first and second windings;
 a power switching circuit connected to the power source and connected to the windings for selectively energizing the windings to generate a magnetic field which causes the rotating assembly to rotate, said power switching circuit including first and second power switches, the first power switch energizing the first winding and the second power switch energizing the second winding, said power switching circuit including a capacitive circuit for driving the windings;
 a hall device providing a position signal representative of the position of the rotating assembly, said hall device being positioned to provide the position signal to indicate when a back emf of the winding becomes positive; and
 a commutating circuit controlling the power switching circuit to commutate the power switching circuit at a commutating angle and at a substantially constant duty cycle to achieve a desired rotating speed of the rotating assembly, said commutating circuit varying the commutating angle in response to the position signal to maintain the substantially constant rotating speed of the rotating assembly whereby the efficiency of the motor is varied to maintain the substantially constant rotating speed, said commutating circuit comprising a processor having an input for receiving the position signal and having first and second outputs for controlling the first and second power switches, respectively, said processor controlling the power switch to energize the winding for a preset period beginning when the position signal indicates that the back emf becomes positive, said preset period being approximately 75% of the period of time during which the back emf is positive; and
 wherein the processor includes software implementing the following operating routine:
  timing out the preset period;
  comparing the speed of the rotating assembly as indicated by the position signal after the preset period to the desired rotating speed;
  advancing the commutation angle by a delta angle when the comparing step indicates that the speed of the rotating assembly is less than the desired rotating speed;
  retarding the commutation angle by a delta angle when the comparing step indicates that the speed of the rotating assembly is greater than the desired rotating speed; and
  repeating the above steps.

11. A motor system for use with a power source comprising:
 a rotating assembly;
 a stationary assembly in magnetic coupling relation to the rotating assembly and including a single phase winding having first and second windings;
 a power switching circuit connected to the power source and connected to the windings for selectively energizing the windings to generate a magnetic field which causes the rotating assembly to rotate, said power switching circuit including first and second power switches, the first power switch energizing the first winding and the second power switch energizing the second winding, said power switching circuit including a capacitive circuit for driving the windings;
 a hall device providing a position signal representative of the position of the rotating assembly, said hall device being positioned to provide the position signal to indicate when a back emf of the winding becomes positive; and a commutating circuit controlling the power switching circuit to commutate the power switching circuit at a commutating angle and at a substantially constant duty cycle to achieve a desired rotating speed of the rotating assembly, said commutating circuit varying the commutating angle in response to the position signal to maintain the substantially constant rotating speed of the rotating assembly whereby the efficiency of the motor is varied to maintain the substantially constant rotating speed, said commutating circuit comprising a processor having an input for receiving the position signal and having first and second outputs for controlling the first and second power switches, respectively, said processor controlling the power switch to energize the winding for a preset period beginning when the position signal indicates that the back emf becomes positive, said preset period being approximately 75% of the period of time during which the back emf is positive; and wherein the processor includes software implementing the following operating routine:
  determining the acceleration of the motor;
  comparing the determined acceleration to a preset acceleration and proceeding to the next step when the comparing step indicates that the determined acceleration of the motor is less than the preset acceleration;
  comparing the motor speed as indicated by the position signal after the preset period to the desired rotating speed;
  advancing the commutation angle by a delta angle when the comparing step indicates that the motor speed is less than the desired rotating speed;
  retarding the commutation angle by a delta angle when the comparing step indicates that the motor speed is greater than the desired rotating speed; and
  repeating the above steps.

12. The motor system of claim 11 wherein the processor includes an input for selecting the desired rotating speed.

13. A motor system for use with a power source comprising:
  a rotating assembly;
  a stationary assembly in magnetic coupling relation to the rotating assembly and including a winding;
  a power switching circuit connected to the power source and connected to the winding for selectively energizing the winding to generate a magnetic field which causes the rotating assembly to rotate, said power switching circuit including a power switch selectively connecting the winding to the power source;
  a position sensing circuit providing a position signal representative of the position of the rotating assembly; and
  a commutating circuit controlling the power switching circuit to commutate the power switching circuit at a commutating angle and at a substantially constant duty cycle to achieve a desired rotating speed of the rotating assembly, said commutating circuit varying the commutating angle in response to the position signal to maintain the substantially constant rotating speed of the rotating assembly whereby the efficiency of the motor is varied to maintain the substantially constant rotating speed, said commutating circuit comprising a processor having an input for receiving the position signal and having outputs for controlling the power switch; and
  wherein the processor includes software implementing the following operating routine:
    timing out a preset period;
    comparing the motor speed as indicated by the position signal after the preset period to the desired rotating speed;
    advancing the commutation angle by a delta angle when the comparing step indicates that the motor speed is less than the desired rotating speed;
    retarding the commutation angle by a delta angle when the comparing step indicates that the motor speed is greater than the desired rotating speed; and
    repeating the above steps.

14. A motor system for use with a power source comprising:
  a rotating assembly;
  a stationary assembly in magnetic coupling relation to the rotating assembly and including a winding;
  a power switching circuit connected to the power source and connected to the winding for selectively energizing the winding to generate a magnetic field which causes the rotating assembly to rotate, said power switching circuit including a power switch selectively connecting the winding to the power source;
  a position sensing circuit providing a position signal representative of the position of the rotating assembly; and
  a commutating circuit controlling the power switching circuit to commutate the power switching circuit at a commutating angle and at a substantially constant duty cycle to achieve a desired rotating speed of the rotating assembly, said commutating circuit varying the commutating angle in response to the position signal to maintain the substantially constant rotating speed of the rotating assembly whereby the efficiency of the motor is varied to maintain the substantially constant rotating speed, said commutating circuit comprising a processor having an input for receiving the position signal and having outputs for controlling the power switch; and
  wherein the processor includes software implementing the following operating routine:
    determining the acceleration of the motor;
    comparing the determined acceleration to a preset acceleration and proceeding to the next step when the comparing step indicates that the determined acceleration of the motor is less than the preset acceleration;
    comparing the motor speed as indicated by the position signal after the preset period to the desired rotating speed;
    advancing the commutation angle by a delta angle when the comparing step indicates that the motor speed is less than the desired rotating speed;
    retarding the commutation angle by a delta angle when the comparing step indicates that the motor speed is greater than the desired rotating speed; and
    repeating the above steps.

15. A motor system for use with a power source comprising:
  a rotating assembly;
  a stationary assembly in magnetic coupling relation to the rotating assembly and including a winding; and
  a control circuit comprising:
    a capacitive power switch circuit including power switches connected between the power source and the winding for selectively energizing the winding to generate a magnetic field which causes the rotating assembly to rotate, said power switch circuit including a capacitive circuit in series with the power source for driving the winding;

a position sensing circuit providing a position signal representative of the position of the rotating assembly; and a switching circuit controlling the power switches to selectively energize the winding to achieve a desired rotating speed of the rotating assembly, wherein the switching circuit varies a timing of the power switches to vary an efficiency of the motor in response to the position signal to maintain the substantially constant rotating speed of the rotating assembly.

* * * * *